Figure 1:
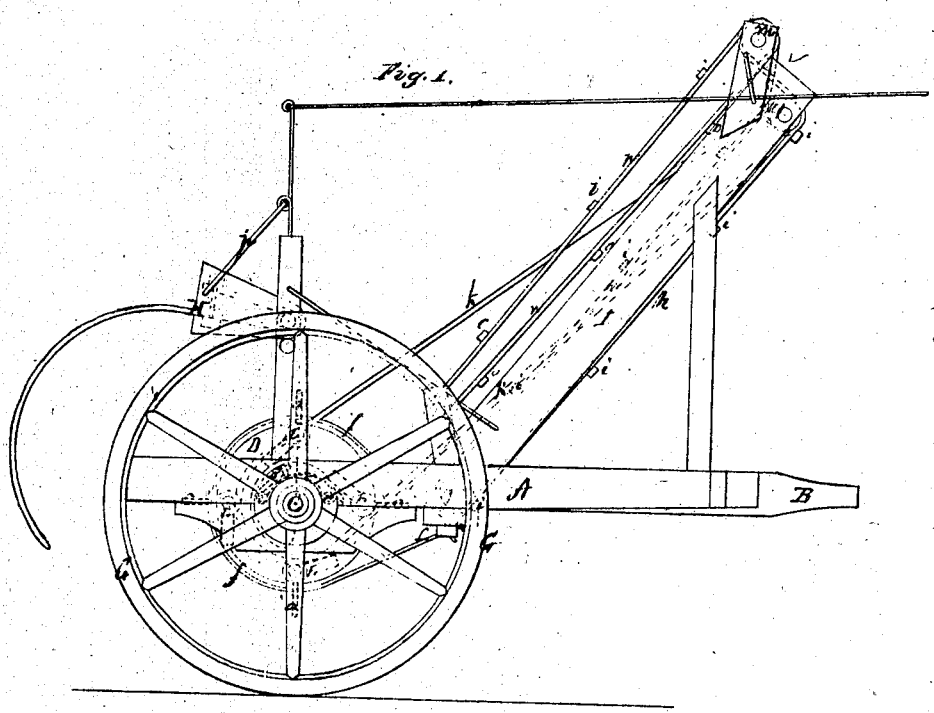

I. J. Parker,
Hay Loader.

No. 105837.

2 Sheets, Sheet 1.

Patented July 26, 1870.

Witnesses
Jno. A. Ellis
J. V. White

Inventor
I. J. Parker
by
J. N. Alexander
Atty

I. J. Parker,
Hay Loader.
2 Sheets, Sheet 2
N° 105,837.
Patented July 26, 1870.
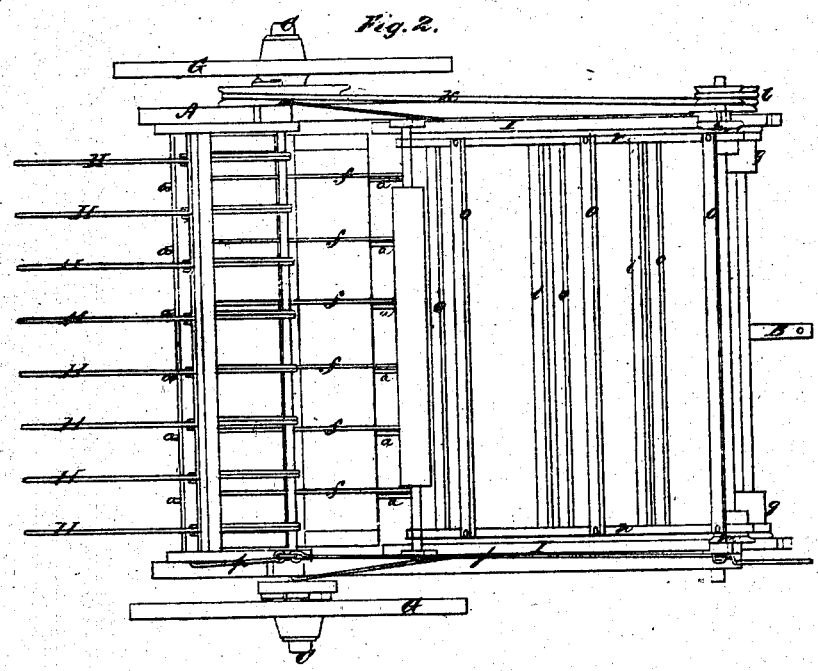
Witnesses.
Jno A. Ellis
G. V. White
Inventor
I. J. Parker
Per
J. H. Alexander
Atty

United States Patent Office.

ISAAC J. PARKER, OF BUFFALO GROVE, IOWA.

Letters Patent No. 105,837, dated July 26, 1870.

IMPROVEMENT IN HAY-LOADERS.

The Schedule referred to in these Letters Patent and making part of the same.

*To all whom it may concern:*

Be it known that I, ISAAC J. PARKER, of Buffalo Grove, in the county of Buchanan and State of Iowa, have invented certain new and useful Improvements in Combined Hay-Rake and Loader; and I do hereby declare that the following is a full, clear, and exact description thereof, reference being had to the accompanying drawings, and to the letters of reference marked thereon, which form a part of this specification.

The nature of my invention consists in the construction and arrangement of a "combined hay-rake and loader," as will be hereinafter fully set forth.

In order to enable others skilled in the art to which my invention appertains to make and use the same, I will now proceed to describe its construction and operation, referring to the annexed drawings, in which—

Figure 1 is a side elevation, and

Figure 2, a plan view of my machine.

A represents the frame of my machine, across the front end of which are two cross-pieces, in which the tongue B is framed.

Near the rear end of the frame A is fixed suitable boxing or bearings, in which the axle C works.

On this axle and within the frame is a drum or cylinder, D, slotted longitudinally in four places, at equal distances apart.

Directly under or opposite each slot, within the drum, is placed a roller, E, the top of which faces up even with the outside surface of the drum.

In the rollers E E are spikes or teeth, $a$ $a$, extending on the outside or beyond the outer surface of the cylinder, for the purpose of taking the hay out of the rake.

These rollers have journals at their ends, which have their bearings in the drum-heads, and loose, so as to allow the rollers to turn or vibrate.

One of these journals for each roller passes through the drum-head far enough to admit a lever or weight, $b$, to be fastened on.

This lever passes over a half circle, $d$, on the inside of the frame A.

This is so arranged that, when the rollers come to the proper place to discharge the hay, the lever drops down and throws the roller back, and the teeth slip out of the hay, leaving it to be taken up by the elevator.

On the ends of the axle C are placed the wheels G G, on which the machine runs.

These wheels are provided with spring ratchets $e$ $e$, so that when the wheels run forward they will turn the axle, and with it the entire machine, but, when they run backward, they will turn on the axle, and not run the machine.

The rake H is attached to the frame above the drum. The teeth of the rake are fixed in a frame, so that they form a spring, so any object may pass under, and they will spring back again.

The teeth work close enough to the drum so that the spikes $a$ $a$ will take the hay out of the rake and throw it over on the elevator.

A series of wires, $f$ $f$, passes around the drum D close to the spike or teeth $a$ $a$, and attached to a cross-bar under the frame A, in front of the drum, to keep the hay from passing below the elevator.

The elevator consists of a light frame, I, made the width of the drum, and fastened at the bottom, in front of the drum, and inclined upward toward the front end of the machine, so that it will carry the hay up to the top of the load.

In the frame I is a bottom, at the upper and lower ends of which are shafts with pulleys, $g$, at each end.

Over these pulleys are endless belts, $h$ $h$, running on top of and below the bottom of the frame I, said endless belts being connected by slats, $i$ $i$, which may or may not be provided with teeth, as is desired.

This elevator is fixed to run like a straw-carrier to a thrashing-machine. It is run by a belt, $k$, from a pulley on the axle C, to a pulley on the top shaft of the elevator, and from this pulley there is a cross-belt, $l$, to a pulley, $m$, above.

The pulley $m$ is on a shaft placed above the upper end of the elevator, and connected by endless belts, $n$ $n$, to a shaft above the lower end of the elevator; said endless belts being also connected by slats $o$ $o$.

This forms, so to say, a double elevator, in the center of which the hay is carried up, so that the wind cannot blow it off.

There is a rod, $p$, fixed to the rake H, so that the operator can raise it, when necessary.

This machine is to be attached to the axle of a wagon, with the elevator extending over the hay-rack. When the wagon is loaded the machine can be detached and attached to another wagon, ready for loading.

Having thus fully described my invention,

What I claim as new, and desire to secure by Letters Patent, is—

1. The combination of drum D with wires $f$ $f$, when said wires pass around the drum, and are secured to a cross-piece in the rear thereof, for the purpose of preventing the hay from passing below the elevator, in the manner set forth.

2. The arrangement of drum D, rollers $e$ $e$, wires $f$ $f$, teeth $a$ $a$, rake H, levers $b$ $b$, cam $a$, and elevators $h$ $i$ and $n$ $o$, all operating as and for the purpose set forth.

In testimony that I claim the foregoing as my own, I affix my signature in the presence of two witnesses.

ISAAC J. PARKER.

Witnesses:
 HENRY PARKER,
 J. W. WILLSON.